(12) United States Patent
Salter et al.

(10) Patent No.: US 11,752,912 B1
(45) Date of Patent: Sep. 12, 2023

(54) VEHICLE SEAT ASSEMBLY HAVING ASSIST HANDLE

(71) Applicant: Ford Global Technologies, LLC, Dearborn, MI (US)

(72) Inventors: Stuart C. Salter, White Lake, MI (US); David Brian Glickman, Southfield, MI (US); Lucretia Williams, Bloomfield Hills, MI (US); Annette Lynn Huebner, Highland, MI (US); Johnathan Andrew Line, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/888,549

(22) Filed: Aug. 16, 2022

(51) Int. Cl.
*B60N 3/02* (2006.01)

(52) U.S. Cl.
CPC ................... *B60N 3/023* (2013.01)

(58) Field of Classification Search
CPC ........ B60N 3/023; B60N 2/753; B60N 2/757; B60N 2/76
USPC ....................................................... 296/1.02
See application file for complete search history.

(56) References Cited

U.S. PATENT DOCUMENTS

| | | | |
|---|---|---|---|
| 7,255,402 B1 | 8/2007 | Haddad et al. | |
| 8,136,875 B2 * | 3/2012 | Laake | B60N 2/753 |
| | | | 297/411.32 |
| 9,522,621 B2 * | 12/2016 | Krajenke | B60N 3/023 |
| 9,821,696 B1 * | 11/2017 | Logan, Jr. | E05B 83/36 |
| 9,987,954 B2 * | 6/2018 | Kimata | B60N 2/938 |
| 10,104,972 B2 * | 10/2018 | Cummins | A47C 7/543 |
| 10,710,483 B2 * | 7/2020 | Keller | B60N 2/753 |
| 10,882,427 B2 * | 1/2021 | Davis | B60N 2/757 |
| 11,027,638 B2 * | 6/2021 | Alexandersson | B60N 2/12 |
| 11,412,856 B2 * | 8/2022 | Himmelhuber | B60N 2/757 |
| 2021/0269163 A1 * | 9/2021 | Woodington | B64D 11/0601 |

FOREIGN PATENT DOCUMENTS

| | | | | |
|---|---|---|---|---|
| DE | 19747703 A1 * | 2/1999 | | B60N 3/023 |
| JP | 2005-112236 A * | 4/2005 | | |
| KR | 1020100097777 A | 9/2010 | | |
| KR | 101190730 B1 * | 10/2012 | | B60N 3/023 |
| KR | 102208271 B1 | 1/2021 | | |

* cited by examiner

*Primary Examiner* — Jason S Morrow

(74) *Attorney, Agent, or Firm* — Vichit Chea; Price Heneveld LLP

(57) ABSTRACT

A vehicle seat assembly includes a seat, a seatback operatively coupled to the seat, and an assist handle located on the seat back, wherein the assist handle is releasable from a stowed position and pivotable outward to a first deployed position and rotatable laterally to a second deployed position. The vehicle seat assembly also includes a release mechanism configured to release the assist handle from at least one of the stowed position and the second deployed position, the release mechanism comprising a bias feature to bias the assist handle towards the first deployed position or the stowed position.

20 Claims, 4 Drawing Sheets

VEHICLE SEAT ASSEMBLY HAVING ASSIST HANDLE

FIELD OF THE DISCLOSURE

The present disclosure generally relates to vehicle seating, and more particularly relates to a vehicle seat assembly having a deployable assist handle for ease of vehicle ingress and egress.

BACKGROUND OF THE DISCLOSURE

Automotive vehicles are commonly equipped with vehicle seat assemblies and handle structures referred to as passenger assist handles for passengers to grasp with their hand when entering and exiting the vehicle. Assist handles are commonly affixed to a support structure in the vehicle. It may be desirable to provide for an assist handle on a vehicle seat that may be positioned to assist with ingress and egress of the vehicle and seat.

SUMMARY OF THE DISCLOSURE

According to a first aspect of the present disclosure, a vehicle seat assembly is provided. The vehicle seat assembly includes a seat, a seatback operatively coupled to the seat, an assist handle located on the seat back, wherein the assist handle is releasable from a stowed position and pivotable outward to a first deployed position and rotatable laterally to a second deployed position, and a release mechanism configured to release the assist handle from at least one of the stowed position and the second deployed position, the release mechanism comprising a bias feature to bias the assist handle towards one of the first deployed position and the stowed position.

Embodiments of the first aspect of the present disclosure can include any one or a combination of the following features:
- the release mechanism comprises a first release mechanism for releasing the assist handle from the stowed position to move towards the first deployed position;
- the first release mechanism comprises a first user release input device operatively coupled to a first locking mechanism;
- the release mechanism comprises a second release mechanism for releasing the assist handle from the second deployed position to move towards the first deployed position;
- the second release mechanism comprises a second user release input device coupled to a second locking mechanism;
- the seatback comprises a setback frame and the assist handle is structurally supported by the seatback frame;
- a strain gauge operatively coupled to the assist handle to sense strain applied to the assist handle;
- an output alarm indicating a sensed strain exceeding a threshold;
- a seat actuator controlled to move the seat to a predetermined position when the assist handle is in a deployed position;
- the assist handle is located on a front side of the seatback;
- the assist handle rotates forward to the first deployed position and laterally outward towards a door opening to the second deployed position;
- the release mechanism comprises a locking pin; and
- the release mechanism further comprises a cable operatively coupled to the locking pin and operating in response to a user input.

According to a second aspect of the present disclosure, a vehicle seat assembly is provided. The vehicle seat assembly includes a seat, a seatback operatively coupled to the seat, an assist handle located on the seat back, wherein the assist handle is releasable from a stowed position in a front side of the seatback and is pivotable forward to a first deployed position and rotatable laterally to a second deployed position, a first release mechanism configured to release the assist handle from the stowed position towards the deployed first position, and a second release mechanism configured to release the assist handle from the second deployed position towards the first deployed position.

Embodiments of the second aspect of the present disclosure can include any one or a combination of the following features:
- the first release mechanism comprises a first user release input device operatively coupled to a first locking mechanism for releasing the assist handle from the stowed position;
- a first spring to return the assist handle from the first deployed position to the stowed position;
- the second release mechanism comprise a second locking mechanism for releasing the assist handle from the second deployed position;
- a second spring to bias the assist handle towards the first deployed position;
- a strain gauge operatively coupled to the assist handle to sense strain applied to the assist handle; and
- an output alarm indicating a sensed strain exceeding a threshold.

These and other features, advantages, and objects of the present invention will be further understood and appreciated by those skilled in the art by reference to the following specification, claims, and appended drawings.

DETAILED DESCRIPTION OF PREFERRED EMBODIMENTS

Figure 1:
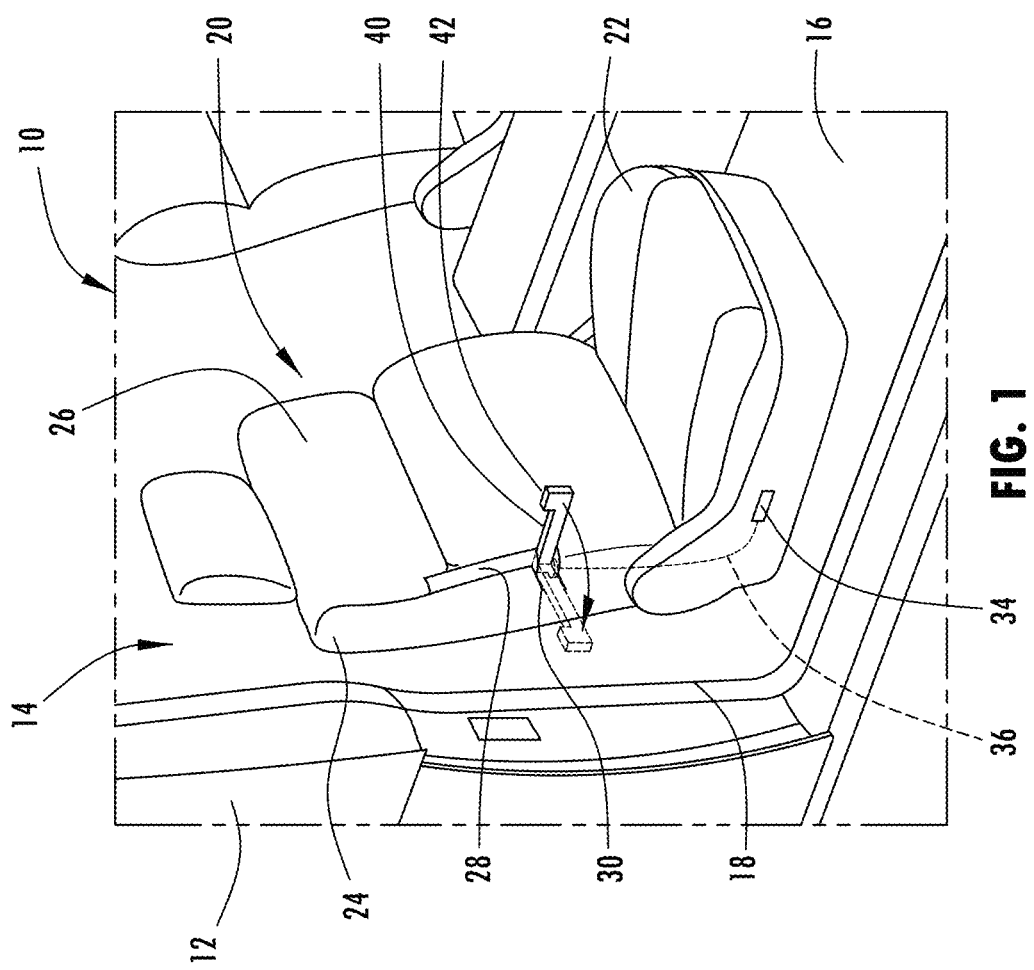
FIG. 1 is a front side perspective view of a motor vehicle equipped with a vehicle seat assembly having a deployable assist handle, according to one embodiment.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a vehicle seat assembly having a deployable assist handle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, a cabin interior 14 of a wheeled automotive or motor vehicle 10 is generally illustrated. The cabin interior 14 is generally defined by a vehicle body 12 and is configured with passenger seating including at least a vehicle seat assembly 20 such as a driver seat or a passenger seat for transporting a user (e.g., person) such as a driver or passenger in the vehicle 10. The cabin interior 14 is encapsulated by the vehicle body 12 which may include one or more door openings 18 that may be exposed when a door is in an open position to allow users to enter or exit the vehicle 10 and may be closed when the door is in the closed position. The arrangement of seating may include a driver seat on one side and forward of a steering wheel assembly and a passenger seat on an opposite lateral side in a front row of the vehicle 10. The vehicle 10 may include one or more rear seats defining additional rows of seating which may include one or more seat assemblies. Each row of seating is generally aligned with a door opening 18 on each lateral side to allow ingress and egress to the vehicle cabin interior 14. The vehicle 10 may have other numbers of rows of seating with seat assemblies as may exist for large SUVs, vans, buses, etc. It should be appreciated that the vehicle 10 may be a motor vehicle, such as a wheeled car, truck, SUV, van or bus, for example, or an airplane, train, boat or other vehicle capable of transporting one or more passengers.

The vehicle seat assembly 20 has a seat 22 and a seatback 24 which is operatively coupled thereto and may pivot relative to the seat 22 amongst different inclination angles. The seat 22 is connected to and supported by an underlying floor 16 of the vehicle 10. The vehicle seat assembly 20 is oriented vehicle-forward in the example shown and the seat 22 generally extends horizontal and vehicle-forward of the seatback 24 which extends upright. Both the seat 22 and seatback 24 may include a frame structure and a cushion which may be upholstered with a seat cover.

The seatback 24 is shown having a seat cover 26 which may include a layer of leather or fabric material, for example. The seat cover 26 generally extends over and covers a seatback frame 32 which is shown in FIG. 2. The seat 22 likewise may have an upholstered cushion and a cover extending over and covering a seat frame.

The vehicle seat assembly 20 is configured to include an assist handle 40 which is supported by and positioned within the seatback 24 of the seat assembly 20. The assist handle 40 may be stowed within a slot 30 on the front side of the seatback 24 near the laterally outside edge near the door opening 18 and extending generally vertical within the seatback frame 32 and the seat cover 26. As such, the assist handle 40 is disposed fully within the slot 30 in a stowed position such that it may not directly contact a user seated on the seat assembly 20 while in the stowed position.

The assist handle 40 is a deployable assist handle that may be deployed from the stowed position within the seatback 24 to a partially deployed first position extending forward of the seatback 24 and further deployed to a fully deployed second position extending laterally of the seatback 24 as illustrated in FIG. 1. In order to deploy the assist handle 40, a user may actuate a first user input release device 34 shown as a lever located on the lateral outward side wall of the seat 22. The first release mechanism includes the first user input release device 34 operatively coupled to an actuatable member, such as a Bowden cable 36, which is coupled to a releasable locking pin 37 in a pivot base of the assist handle 40.

Figure 2A:
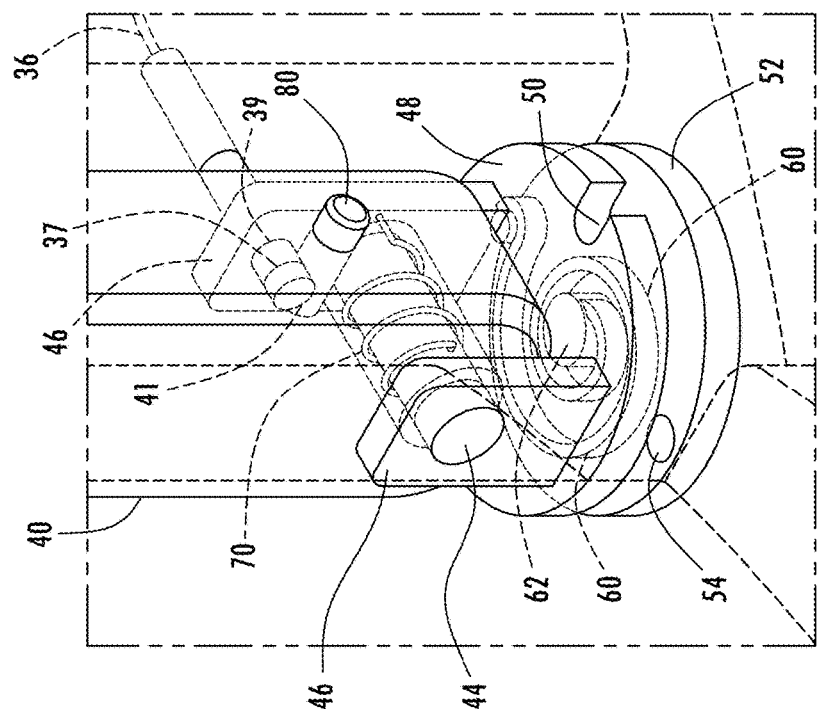
FIG. 2A is an enlarged perspective view of the pivot base of the assist handle shown in FIG. 2.
Figure 2:
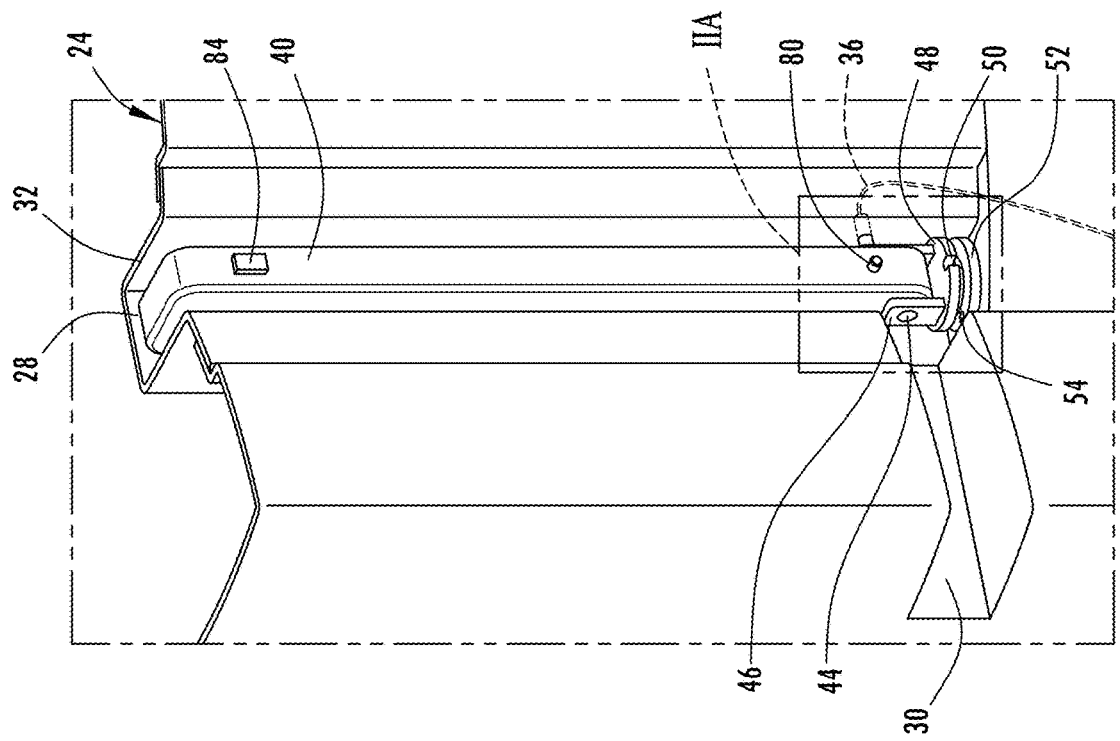
FIG. 2 is an enlarged front perspective view of the vehicle seat having the deployable assist handle shown in a stowed position.

The pivot base of the assist handle 40 is shown in the stowed position in FIGS. 2 and 2A having a cylindrical rotating plate 48 positioned on top of a fixed cylindrical base plate 52. The rotating plate 48 has an opening 50 and the base plate 52 has a hole 54 positioned for locking rotation of the rotating plate 48. A second locking pin 80 is located on the underside of the assist handle 40 and may engage the opening 50 and may be locked within the hole 54 in the fully deployed second position when opening 50 is aligned with hole 54. The second locking pin 80 along with opening 50 and hole 54 and a user input 84 and Bowden cable 86 operate as a second release mechanism.

Figure 3A:
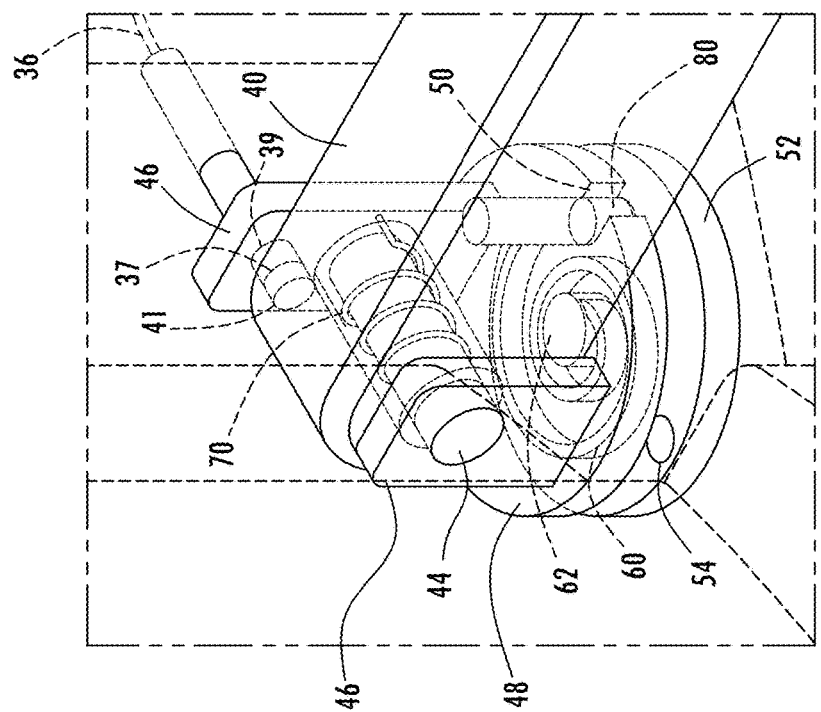
FIG. 3A is an enlarged perspective view of the pivot base showing the assist handle in the partially deployed first position of FIG. 3.
Figure 3:
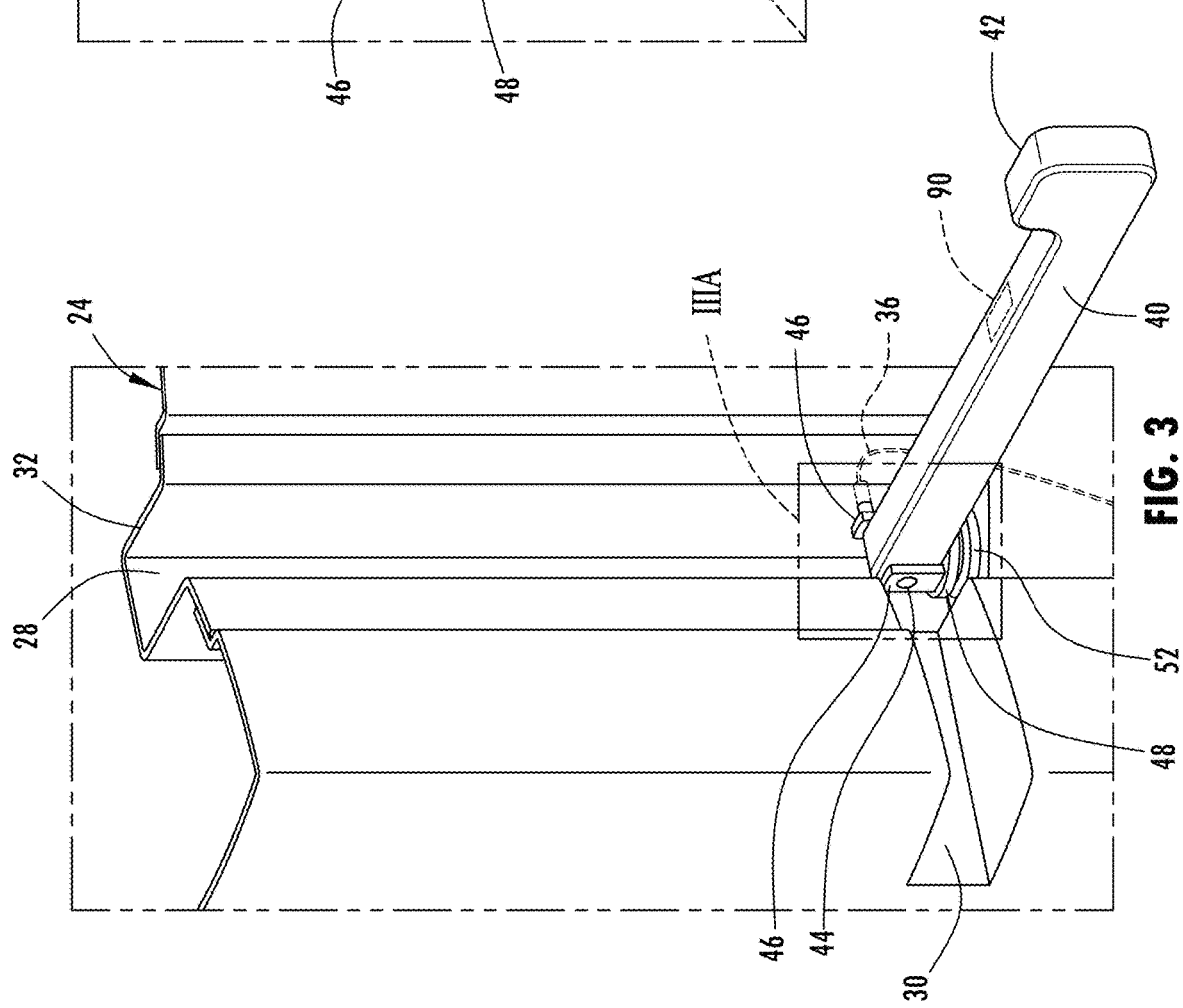
FIG. 3 is an enlarged perspective view of the vehicle seat assembly showing the assist handle in a partially deployed first position.
Figure 4A:
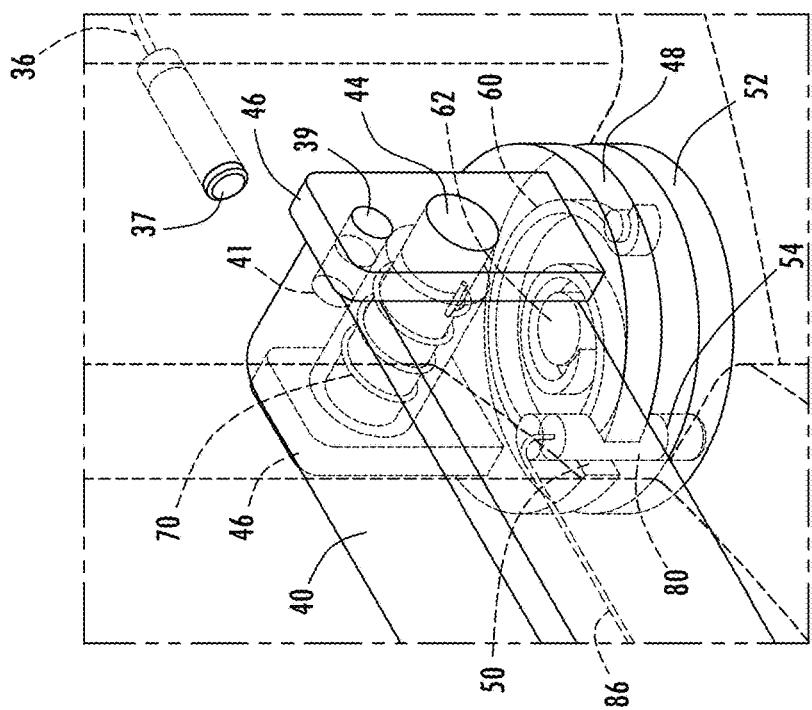
FIG. 4A is an enlarged perspective view of the pivot base showing the assist handle in the fully deployed second position of FIG. 4.
Figure 4:
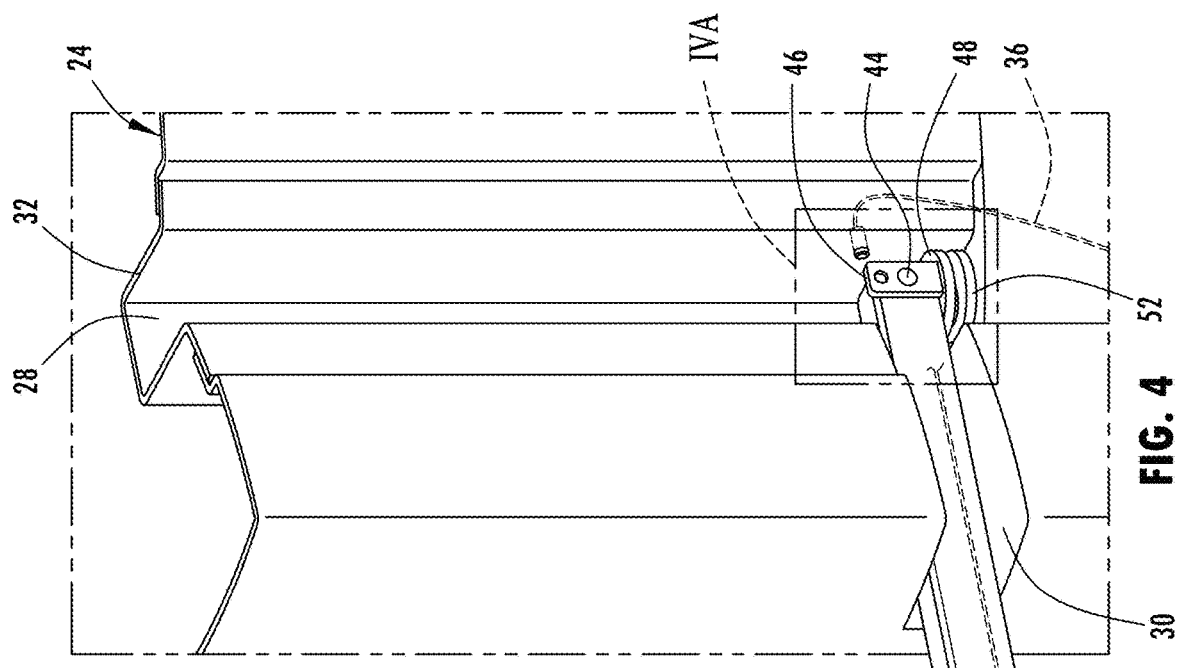
FIG. 4 is an enlarged perspective view of the vehicle seat assembly showing the assist handle in a fully deployed second position.

The assist handle 40 pivots about a horizontal pin 44 between the upright stowed position shown in FIGS. 2 and 2A and a downward partially deployed first position shown in FIGS. 3 and 3A or a fully deployed second position shown in FIGS. 4 and 4A. Pin 44 extends through a pair of openings in bracket 46 and may rotate approximately 90° with the assist handle 40. The assist handle 40 may rotate 90°-120°, for example, between the stowed position and the first deployed position.

Upon actuation of the first user input release device 34 by a user, the assist handle 40 is released by the first locking pin 37 being disengaged from hole 41 in the assist handle 40. The assist handle 40 is spring biased clockwise to extend outward in a forward and downward direction by a first bias feature shown as a first bias spring 70 which may include a coil spring operatively coupled to pin 44. The first bias spring 70 may actuate the assist handle 40 from the upright stowed position downward to a substantially horizontally partially deployed first position as seen in FIGS. 3 and 3A. In the partially deployed first position, a user seated in the seat assembly 20 or approaching the seat assembly 20 may engage the assist handle 40 for support in that position to exit or enter the seat assembly 20. In addition, a user may apply force laterally outward to rotate the assist handle 40 laterally outward towards the door opening 18 within horizontal slot 30 in the seatback 24 by approximately 90° to a fully deployed second position as shown in FIGS. 4 and 4A. In the fully deployed second position, the assist handle 40 is locked in place via the locking pin 80 engaged in hole 54. A second bias feature shown as a second bias spring 60 applies a bias force to bias the assist handle 40 from the fully deployed second position back to the partially deployed first position. As such, a user must apply enough force to overcome the second bias spring 60 to move the assist handle 40 from the partially deployed first position to the fully deployed second position at which point the locking pin 80 engages hole 54 in the base plate 52 to lock the assist handle 40 in the fully deployed second position. In the fully deployed second position, a user may further grasp the assist handle 40 for assistance while entering or exiting the seating assembly 20 and the vehicle 10.

The assist handle 40 includes an enlarged handle portion 42 at the extreme end thereof, according to one example. Located on the assist handle 40 on the underside is the second user release input device 84 such as an input button that may be actuated by a user to release the assist handle 40 from the fully deployed second position so that it may move back to the partially deployed first position. The second user release input device 84 is operatively coupled to a Bowden cable 86 as seen in FIGS. 4 and 4A which forces the locking pin 80 out of engagement with the hole 54 to thereby release the assist handle 40. The assist handle 40 may then be biased to the partially deployed first position and then may be rotated upward with force by a user to the fully stowed position within slot 28 in the seatback 24.

The assist handle 40 may include a strain gauge 90 shown located on the assist handle 40 in FIG. 4. The strain gauge 90 is configured to measure the amount of strain or force applied to the assist handle 40. The strain gauge 90 may be located elsewhere on the assist handle 40 or on the pivot base. The strain gauge 90 may generate an output signal that may be used to sound an audible alarm if an approaching load limit is reached.

The seat assembly 20 may be actuated to move to various seating positions based on the anticipated use of the assist handle 40. For example, the seat assembly 20 may remain in its current seating position anticipating return of the same user needing to use the assist handle 40. The seat assembly 20 may return to an original seating position before the assist handle was actuated or a select seating position in order to allow a user who does not need the assist handle 40 to enter or exit the seat assembly 20 and vehicle 10.

In the example shown, the vehicle seat assembly 20 employs a manually actuatable assist handle 40. It should be appreciated that the assist handle 40 may be equipped with one or more actuators to actuate the assist handle 40 amongst the stowed positon, the partially deployed first position and the fully deployed second position. The one or more actuators may include one or more electric motors, for example, that may be controlled by a controller in response to user inputs.

Accordingly, the vehicle seat assembly 20 advantageously provides for an assist handle 40 located in the seatback 24 which may be deployed from a stowed position to one or more deployed positions such as the partially deployed first position and the fully deployed second position to assist a user with ingress and egress of the vehicle 10 and seat assembly 20. This advantageously allows for a user to more easily enter and exit the vehicle 10.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat assembly comprising:
   a seat;
   a seatback operatively coupled to the seat;
   an assist handle located on the seat back, wherein the assist handle is releasable from a stowed position and pivotable outward to a first deployed position and rotatable laterally to a second deployed position; and
   a release mechanism configured to release the assist handle from at least one of the stowed position and the second deployed position, the release mechanism comprising a bias feature to bias the assist handle towards one of the first deployed position and the stowed position.

2. The vehicle seat assembly of claim 1, wherein the release mechanism comprises a first release mechanism for releasing the assist handle from the stowed position to move towards the first deployed position.

3. The vehicle seat assembly of claim 2, wherein the first release mechanism comprises a first user release input device operatively coupled to a first locking mechanism.

4. The vehicle seat assembly of claim 3, wherein the release mechanism comprises a second release mechanism for releasing the assist handle from the second deployed position to move towards the first deployed position.

5. The vehicle seat assembly of claim 4, wherein the second release mechanism comprises a second user release input device coupled to a second locking mechanism.

6. The vehicle seat assembly of claim 1, wherein the seatback comprises a setback frame and the assist handle is structurally supported by the seatback frame.

7. The vehicle seat assembly of claim 1 further comprising a strain gauge operatively coupled to the assist handle to sense strain applied to the assist handle.

8. The vehicle seat assembly of claim 7 further comprising an output alarm indicating a sensed strain exceeding a threshold.

9. The vehicle seat assembly of claim 1 further comprising a seat actuator controlled to move the seat to a predetermined position when the assist handle is in a deployed position.

10. The vehicle seat assembly of claim 1, wherein the assist handle is located on a front side of the seatback.

11. The vehicle seat assembly of claim 10, wherein the assist handle rotates forward to the first deployed position and laterally outward towards a door opening to the second deployed position.

12. The vehicle seat assembly of claim 1, wherein the release mechanism comprises a locking pin.

13. The vehicle seat assembly of claim 12, wherein the release mechanism further comprises a cable operatively coupled to the locking pin and operating in response to a user input.

14. A vehicle seat assembly comprising:
    a seat;
    a seatback operatively coupled to the seat;
    an assist handle located on the seat back, wherein the assist handle is releasable from a stowed position in a front side of the seatback and is pivotable forward to a first deployed position and rotatable laterally to a second deployed position;
    a first release mechanism configured to release the assist handle from the stowed position towards the deployed first position; and
    a second release mechanism configured to release the assist handle from the second deployed position towards the first deployed position.

15. The vehicle seat assembly of claim 14, wherein the first release mechanism comprises a first user release input device operatively coupled to a first locking mechanism for releasing the assist handle from the stowed position.

16. The vehicle seat assembly of claim 15 further comprising a first spring to return the assist handle from the first deployed position to the stowed position.

17. The vehicle seat assembly of claim 14, wherein the second release mechanism comprise a second locking mechanism for releasing the assist handle from the second deployed position.

18. The vehicle seat assembly of claim 17 further comprising a second spring to bias the assist handle towards the first deployed position.

19. The vehicle seat assembly of claim 14 further comprising a strain gauge operatively coupled to the assist handle to sense strain applied to the assist handle.

20. The vehicle seat assembly of claim 19 further comprising an output alarm indicating a sensed strain exceeding a threshold.

* * * * *